US011300421B2

(12) United States Patent
Watanabe et al.

(10) Patent No.: US 11,300,421 B2
(45) Date of Patent: Apr. 12, 2022

(54) ALIGHTING POSITION SETTING DEVICE AND AUTONOMOUS DRIVING SYSTEM

(71) Applicant: TOYOTA JIDOSHA KABUSHIKI KAISHA, Toyota (JP)

(72) Inventors: Junya Watanabe, Sunto-gun (JP); Seiji Arakawa, Sunto-gun (JP); Yuji Sasaki, Toyota (JP); Masafumi Hayakawa, Susono (JP); Naotoshi Kadotani, Sunto-gun (JP); Takashi Hayashi, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 10 days.

(21) Appl. No.: 16/127,522

(22) Filed: Sep. 11, 2018

(65) Prior Publication Data
US 2019/0113357 A1 Apr. 18, 2019

(30) Foreign Application Priority Data

Oct. 16, 2017 (JP) .............................. JP2017-200373

(51) Int. Cl.
*G01C 21/36* (2006.01)
*G05D 1/02* (2020.01)

(52) U.S. Cl.
CPC ....... *G01C 21/3605* (2013.01); *G05D 1/0212* (2013.01); *G05D 2201/0212* (2013.01); *G05D 2201/0213* (2013.01)

(58) Field of Classification Search
CPC ............ G01C 21/3605; G01C 21/3438; G05D 1/0212; G05D 2201/0212; G05D 2201/0213; G05D 1/0278
See application file for complete search history.

(56) References Cited

U.S. PATENT DOCUMENTS 9,368,026 B1* 6/2016 Herbach ................ G08G 1/202
2006/0089765 A1* 4/2006 Pack ...................... G06N 3/008
701/23

(Continued)

FOREIGN PATENT DOCUMENTS

JP 2003-109181 A 4/2003
JP 2003-217096 A 7/2003

(Continued)

OTHER PUBLICATIONS

Kenneth Vanhoey et al., "VarCity—the Video: the Struggle and Triumphs of Leveraging Fundamental Research Results in a Graphics Video Production", ACM SIGGRAPH '17 Talks, Jul. 30-Aug. 3, 2017, 2 pages.

*Primary Examiner* — Rami Khatib
(74) *Attorney, Agent, or Firm* — Sughrue Mion, PLLC

(57) ABSTRACT

An alighting position setting device includes an option presentation unit configured to present an occupant of a vehicle with multiple options set in advance relating to a request for an alighting position for a destination when the vehicle in an autonomous driving toward the destination set in advance approaches the destination, an option recognition unit configured to recognize the option selected by the occupant from the multiple options, and an alighting position setting unit configured to set an alighting position based on the request for the alighting position corresponding to the option selected by the occupant.

1 Claim, 4 Drawing Sheets

(56) References Cited

U.S. PATENT DOCUMENTS

| | | | | |
|---|---|---|---|---|
| 2010/0305846 | A1* | 12/2010 | Tachihana | G01C 21/3423 |
| | | | | 701/533 |
| 2015/0294566 | A1* | 10/2015 | Huang | G08G 1/133 |
| | | | | 701/41 |
| 2016/0061617 | A1* | 3/2016 | Duggan | G06F 16/248 |
| | | | | 701/538 |
| 2017/0074672 | A1* | 3/2017 | Allen | G01C 21/3602 |
| 2017/0147959 | A1* | 5/2017 | Sweeney | G07C 5/008 |
| 2018/0101179 | A1* | 4/2018 | Louey | B62K 15/00 |
| 2018/0114259 | A1* | 4/2018 | Ross | G06Q 30/0283 |
| 2018/0136655 | A1* | 5/2018 | Kim | G05D 1/0088 |
| 2018/0164106 | A1* | 6/2018 | Peterson | G05D 1/0276 |
| 2018/0224852 | A1* | 8/2018 | Tanahashi | G01C 21/3605 |
| 2018/0326997 | A1* | 11/2018 | Sweeney | G01C 21/3617 |
| 2019/0113357 | A1* | 4/2019 | Watanabe | G01C 21/3605 |

FOREIGN PATENT DOCUMENTS

| | | |
|---|---|---|
| JP | 2009-092534 A | 4/2009 |
| JP | 2009-204576 A | 9/2009 |
| JP | 2011-112613 A | 6/2011 |
| JP | 2016-86314 A | 5/2016 |
| JP | 2016-148681 A | 8/2016 |

\* cited by examiner

Fig.3

| OPTIONS | CONTENT |
|---|---|
| 1 | ALIGHTING POSITION: AUTOMATIC SETTING BY SYSTEM (TIME PRIORITY) |
| 2 | ALIGHTING POSITION: FRONT OF MAIN GATE |
| 3 | ALIGHTING POSITION: AT SYSTEM'S DISCRETION |

ALIGHTING POSITION SETTING DEVICE AND AUTONOMOUS DRIVING SYSTEM

CROSS-REFERENCE TO RELATED APPLICATION

This application claims the benefit of priority from Japanese Patent Application No. 2017-200373, filed Oct. 16, 2017, the entire contents of which are incorporated herein by reference.

TECHNICAL FIELD

The present disclosure relates to an alighting position setting device and an autonomous driving system.

BACKGROUND

In autonomous driving vehicles, usually, a destination is set in advance before a start of traveling in an autonomous driving. In US Unexamined Patent Publication No. 2017-0147959, a system is disclosed, that realizes a vehicle dispatch service in which a pickup position and a destination of a user are set in advance and an autonomous driving vehicle is dispatched to the pickup position and the user is transported to the destination by the autonomous driving vehicle.

SUMMARY

Incidentally, an occupant (a user) may have a desire for a detailed alighting position at the destination. Therefore, in the present technical field, it is desirable to provide an alighting position setting device and an autonomous driving system that can set an alighting position reflecting the occupant's desire.

According to an aspect of the present disclosure, an alighting position setting device includes: an option presentation unit configured to present an occupant of a vehicle with multiple options set in advance relating to a request for an alighting position for a destination set in advance when the vehicle in an autonomous driving toward the destination approaches the destination; an option recognition unit configured to recognize the option selected by the occupant from the multiple options; and an alighting position setting unit configured to set an alighting position based on the request for the alighting position corresponding to the option selected by the occupant.

According to this alighting position setting device, when the vehicle in the autonomous driving approaches the destination, an option that matches the occupant's desire is selected by the occupant from the multiple options relating to the request for the alighting position. The alighting position is set based on the request for the alighting position corresponding to the selected option. Therefore, this device can set the alighting position reflecting an occupant's desire.

In the alighting position setting device in the aspect of the present disclosure, the option presentation unit may present the multiple options including at least an automatic setting option in which the alighting position setting unit automatically sets the alighting position and a manual setting option in which the occupant manually sets the alighting position. According to the device, if the automatic setting option is selected by the occupant, the alighting position is automatically set. Therefore, it is possible to improve the convenience for the occupant. On the other hand, if the manual setting option is selected by the occupant, the occupant sets the alighting position by him/herself. Therefore, the occupant's desire can be more appropriately reflected on the alighting position. Therefore, in this device, it is possible to appropriately set the alighting position according to the occupant's desire.

According to another aspect of the present disclosure, there is provided an autonomous driving system that is configured to set an alighting position in an autonomous driving, the system including an autonomous driving ECU. The autonomous driving ECU is configured to present an occupant of a vehicle with multiple options set in advance relating to a request for an alighting position for a destination when the vehicle in an autonomous driving toward the destination set in advance approaches the destination, recognize the option selected by the occupant from the multiple options, and set the alighting position based on the request for the alighting position corresponding to the option selected by the occupant.

In the autonomous driving system in the aspect of the present disclosure, the autonomous driving ECU may be configured to present the multiple options including at least an automatic setting option in which the alighting position is automatically set and a manual setting option in which the occupant manually sets the alighting position.

According to various aspects of the present disclosure, it is possible to set an alighting position reflecting the occupant's desire.

BRIEF DESCRIPTION OF THE DRAWINGS

FIG. 3 is a diagram illustrating an example of a plurality of options output as images on a display.

DETAILED DESCRIPTION

Hereinafter, exemplary embodiments will be described with reference to the drawings.

Figure 1:
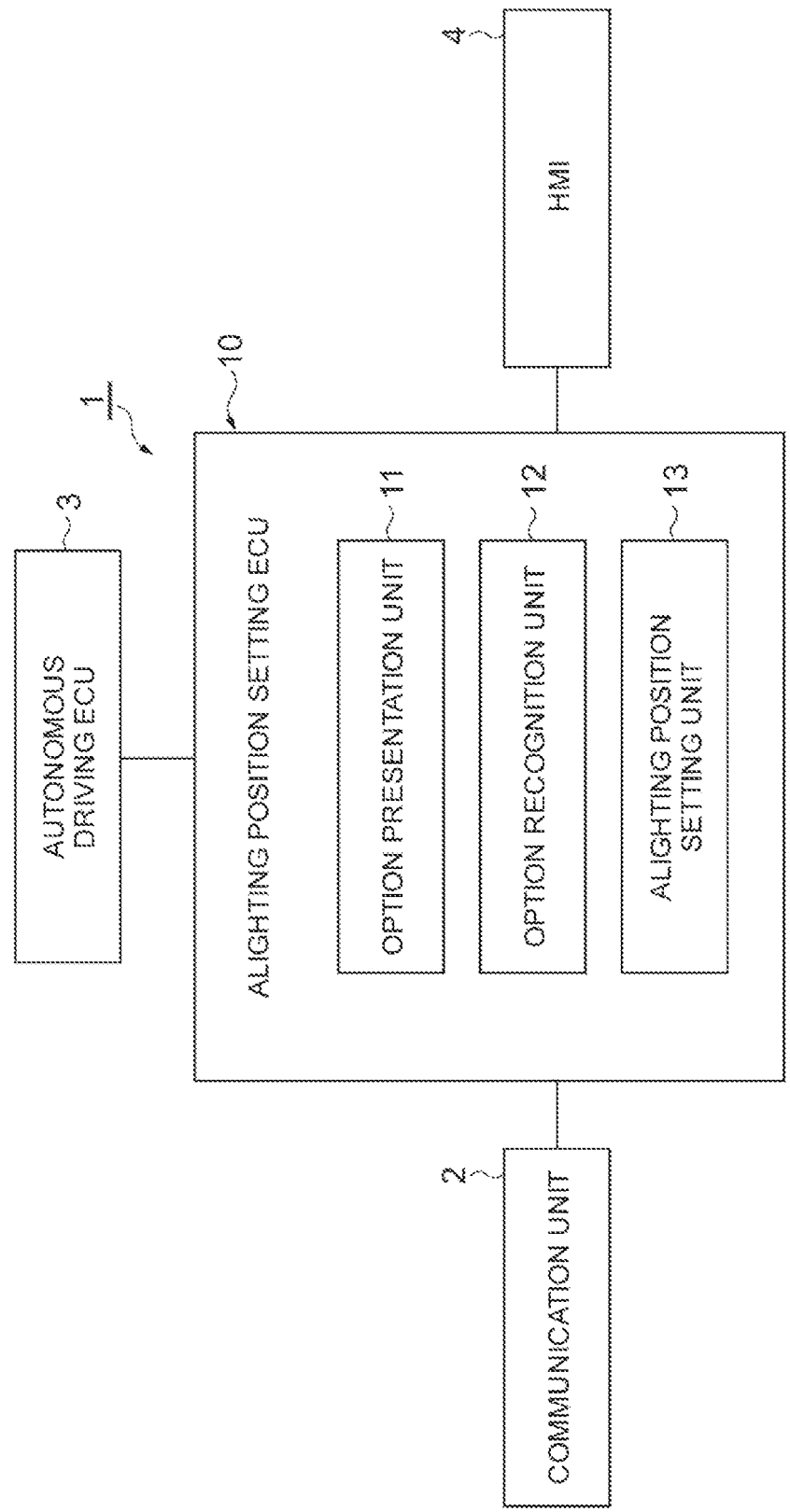
FIG. 1 is a block diagram illustrating an alighting position setting device in the present embodiment.

FIG. 1 is a block diagram illustrating an alighting position setting device 1 in the present embodiment. As illustrated in FIG. 1, the alighting position setting device 1 is a device that is mounted in a vehicle such as a passenger car which is capable of autonomously driving, and sets a detailed alighting position at a destination for the autonomous driving.

The "autonomous driving" is a vehicle control that causes the vehicle to autonomously travel toward a destination set in advance. In the autonomous driving, an occupant does not need to perform a driving operation and the vehicle travels automatically. The "destination" is a target point of the autonomous driving set in advance before the start of the traveling by the autonomous driving by the occupant or the like. The destination is set based on, for example, map information stored in advance in a map database of the vehicle. As an example, the destination is set as an area corresponding to a premises of a facility such as a shopping center. The "alighting position" is a position at which the occupant alights from the vehicle at the destination or in the vicinity of the destination. The alighting position is set as a more detailed point than the destination set as the area. As an example, if the destination is set to a specific facility (area) such as a shopping center, the alighting position is set to a specific point of the shopping center (such as front of a main gate, front of a back gate, an entrance of a parking lot, and the like). The occupant does not necessarily need to alight from the vehicle at the alighting position.

The alighting position setting device 1 includes an alighting position setting electronic control unit (ECU) 10 that performs overall control of the device. The alighting position setting ECU 10 is an electronic control unit that includes a central processing unit (CPU), read only memory (ROM), random access memory (RAM), and a controller area network (CAN) communication circuit. The alighting position setting ECU 10 realizes each function by loading a program stored in the ROM into the RAM and executing the program loaded in the RAM by the CPU. The alighting position setting ECU 10 may be configured with a plurality of ECUs. A part of the functions of the alighting position setting ECU 10 may be performed by a server capable of communicating with the vehicle.

A communication unit 2, an autonomous driving ECU 3, and a human machine interface (HMI) 4 are connected to the alighting position setting ECU 10.

The communication unit 2 acquires various information items via a wireless network (for example, the Internet, a vehicle information and communication system (VICS (registered trademark)) and the like). The communication unit 2 communicates with a map information server that stores the map information. The map information is stored in the map information server. The map information includes information on a position of a road, information on a shape of the road (for example, a curve, a type of a linear portion, a curvature of the curve, and the like), information on a position of an intersection and a branch point, information on a position of a structure, and the like. The map information also includes facility data including a position of facilities and types of the facilities (types of a school, a hospital, a station, a convenience store, and the like). The position of the facility is specified as the area corresponding to the premises of the facility. In addition, the map information includes information on an alighting position candidate point. The "alighting position candidate point" is a point set in advance as a candidate for the alighting position at which the occupant alights from the vehicle of the autonomous driving. The alighting position candidate point includes specific points (front of the main gate, front of the back gate, the entrance of the parking lot, and the like) of the shopping center, or the like described above. The alighting position setting device 1 may include the map database that stores the map information described above.

The communication unit 2 acquires information on the surroundings situation at the destination via the wireless network. The information on the surroundings situation may include detailed map information, traffic information (a traffic regulation, a congestion situation, a vacancy situation of the parking lot, information on street parking, and the like), image and moving picture information around the destination. The communication unit 2 may acquire information stored in a computer of a facility such as an information management center, information acquired from a monitoring camera installed on the street, information acquired from an imaging device or the like mounted on another vehicle, and the like. The communication unit may acquire various information items by a road-to-vehicle communication with a roadside transceiver (for example, an optical beacon, an intelligent transport systems (ITS) spot, and the like) provided at the side of a road. The communication unit 2 outputs the acquired information on the surroundings situation at the destination to the alighting position setting ECU 10.

The autonomous driving ECU 3 is an electronic control unit for performing the autonomous driving of the vehicle. The autonomous driving ECU 3 is the electronic control unit that includes a CPU, a ROM, a RAM, a CAN communication circuit, and the like. The autonomous driving ECU 3 realizes each function of the autonomous driving by loading a program stored in the ROM into the RAM and executing the program loaded in the RAM by the CPU. The autonomous driving ECU 3 may be configured with a plurality of ECUs. A part of the functions of the autonomous driving ECU 3 may be performed by a server capable of communicating with the vehicle.

The autonomous driving ECU 3 generates a travel plan along a target route to the destination set in advance based on information on a position of the vehicle measured by a vehicle-mounted global positioning system (GPS) receiver, the map information in the map database, an environment around the vehicle (a position of another vehicle, and the like) recognized from the result of measurement performed by the vehicle-mounted cameras and radar sensors (millimeter wave radar and LIDAR) and a vehicle state (a vehicle speed, a yaw rate, and the like) recognized from the result of measurement performed by the vehicle-mounted internal sensors (a vehicle speed sensor, a yaw rate sensor and the like). The destination may be set by the occupant or the like via an HMI 4 described later. The target route may be set by a well-known navigation system based on the destination. The navigation system in this case may be integrated with the autonomous driving ECU 3.

The autonomous driving ECU 3 performs autonomous driving toward the destination according to the travel plan. The autonomous driving ECU 3 performs the autonomous driving by transmitting a control signal to an actuator of the vehicle (an engine actuator, a steering actuator, a brake actuator, or the like). The autonomous driving ECU 3 can generate the travel plan and perform the autonomous driving using a well-known method. If the alighting position is set by the alighting position setting device 1 (details will be described later), the autonomous driving ECU 3 performs the autonomous driving toward the set alighting position.

During the autonomous driving of the vehicle, the autonomous driving ECU 3 determines whether or not the vehicle approaches the destination based on the information on a position of the vehicle, the map information in the map database measured by the vehicle-mounted GPS receiver, and the generated travel plan. The position of the vehicle may be recognized by a simultaneous localization and mapping (SLAM). "The vehicle approaches the destination" means, for example, that the vehicle reaches a point of a predetermined distance to the destination on the route toward the destination. "The vehicle approaches the destination" may mean that the vehicle reaches a point of a predetermined time before the arrival at the destination. If it is determined that the vehicle approaches the destination, the autonomous driving ECU 3 outputs the result of determination to the alighting position setting device 1. The alighting position setting device 1 may determine whether or not the vehicle approaches the destination.

The HMI 4 is an interface that performs inputting and outputting of the information between the alighting position setting device 1 and the occupants. The HMI 4 includes, for example, an input unit such as a button, a touch panel, and an output unit such as a display and a speaker. The HMI 4 outputs an image on the display and outputs a voice from the speaker according to a control signal from the alighting position setting ECU 10.

Next, a functional configuration of the alighting position setting ECU 10 will be described. The alighting position setting ECU 10 includes an option presentation unit 11, an option recognition unit 12, and an alighting position setting unit 13.

When the vehicle in the autonomous driving toward the destination set in advance approaches the destination, the option presentation unit 11 presents the occupant of the vehicle with multiple choices set in advance relating to a request for the alighting position for the destination. The option presentation unit 11 presents the multiple options, for example, by the image output on the display and the voice output from the speaker of the HMI 4. The "request for the alighting position" is an occupant's desire on the alighting position at the destination. The request for the alighting position includes desires such as whether or not the occupant sets the alighting position by him/herself, and a desired position where a specific alighting position to be set if the occupant sets the alighting position by him/herself, a desired condition for causing the alighting position setting device 1 to set the alighting position if the occupant does not set the alighting position by him/herself.

The option presentation unit 11 presents multiple options including at least an automatic setting option and a manual setting option. The "automatic setting option" is an option that the alighting position setting device 1 (the alighting position setting unit 13) automatically sets the alighting position. The "manual setting option" is an option that the occupant manually sets the alighting position.

In the present embodiment, the option presentation unit 11 presents a time priority first option (the automatic setting option), an alighting position priority second option (the manual setting option), and a third option at system's discretion (the automatic setting option). The "first option" is an option relating to the request for the alighting position for the alighting position setting unit 13 to automatically set the alighting position. In the first option, any of the points (the alighting position candidate points) at the destination set in advance is set as the alighting position. In the first option, the occupant does not need to set the alighting position, and the priority is put on a point that the occupant's time is not constrained. The option presentation unit 11 outputs a message as an image having a content saying "alighting position: automatic setting by the system (time priority)" to the display of the HMI 4 as the first option (refer to FIG. 3).

The "second option" is an option relating to the request for the alighting position for the occupant to manually set the alighting position. In the second option, a specific point (an alighting position candidate point) at the destination set in advance or in the vicinity of the destination is set as the alighting position according to the operation performed by the occupant. The option presentation unit 11 outputs one or more messages saying "alighting position: front of the main gate", "alighting position: front of the back gate", and "alighting position: entrance of the parking lot" as images to the display of the HMI 4 as the second option (refer to FIG. 3).

If the destination is set to the entire area of a specific facility or the like, the second option of "alighting position: front of the main gate" corresponds to the request for the alighting position to set the alighting position in front of the main gate of the facility or the like. If the destination is set to the entire area of a specific facility or the like, the second option of "alighting position: front of the back gate" corresponds to the request for the alighting position to set the alighting position in front of the back gate of the facility or the like. If the destination is set to the entire area of a specific facility or the like, the second option of "alighting position: entrance of the parking lot" corresponds to the request for the alighting position to set the alighting position at the entrance of the parking t of the facility or the like.

The "third option" is an option relating to the request for the alighting position for the alighting position setting unit 13 to automatically set the alighting position. In the third option, a point (alighting position candidate point) derived according to a predetermined condition set in advance by the user for the alighting position at the destination set in advance or in the vicinity of the destination is set as the alighting position. The "condition set by the user" is a condition such as a point that can be reached with a minimum amount of fuel consumption within a range of a predetermined distance from the destination. The option presentation unit 11 outputs a message saying "alighting position: at system's discretion" as an image to the display of the HMI 4 as the third option (refer to FIG. 3). The option presentation unit 11 may output the voice of each message described above from the speaker.

When the multiple options relating to the request for the alighting position are presented via the HMI 4 by the option presentation unit 11, an option that matches the occupant's desire is selected from these options by the occupant. For example, the option is input by operating the button and the touch panel of the HMI 4. The option recognition unit 12 recognizes the option selected by occupant from the multiple options presented by the option presentation unit 11.

The alighting position setting unit 13 sets the alighting position based on the request for the alighting position corresponding to the option selected by the occupant. For example, if the first option of "alighting position: automatic setting by the system (time priority)" is selected by the occupant, the alighting position setting unit 13 sets any point at the destination set in advance as the alighting position. If the second option of "alighting position: front of the main gate" is selected by the occupant, the alighting position setting unit 13 sets the front of the main gate of the facility or the like which is the destination as the alighting position. If the third option of "alighting position: system's discretion" is selected by the occupant, the alighting position setting unit 13 derives a specific point according to a predetermined proposed condition for the alighting position, and sets the derived point as the alighting position. The alighting position setting unit 13 transmits the set alighting position to the autonomous driving ECU 3.

Figure 2:
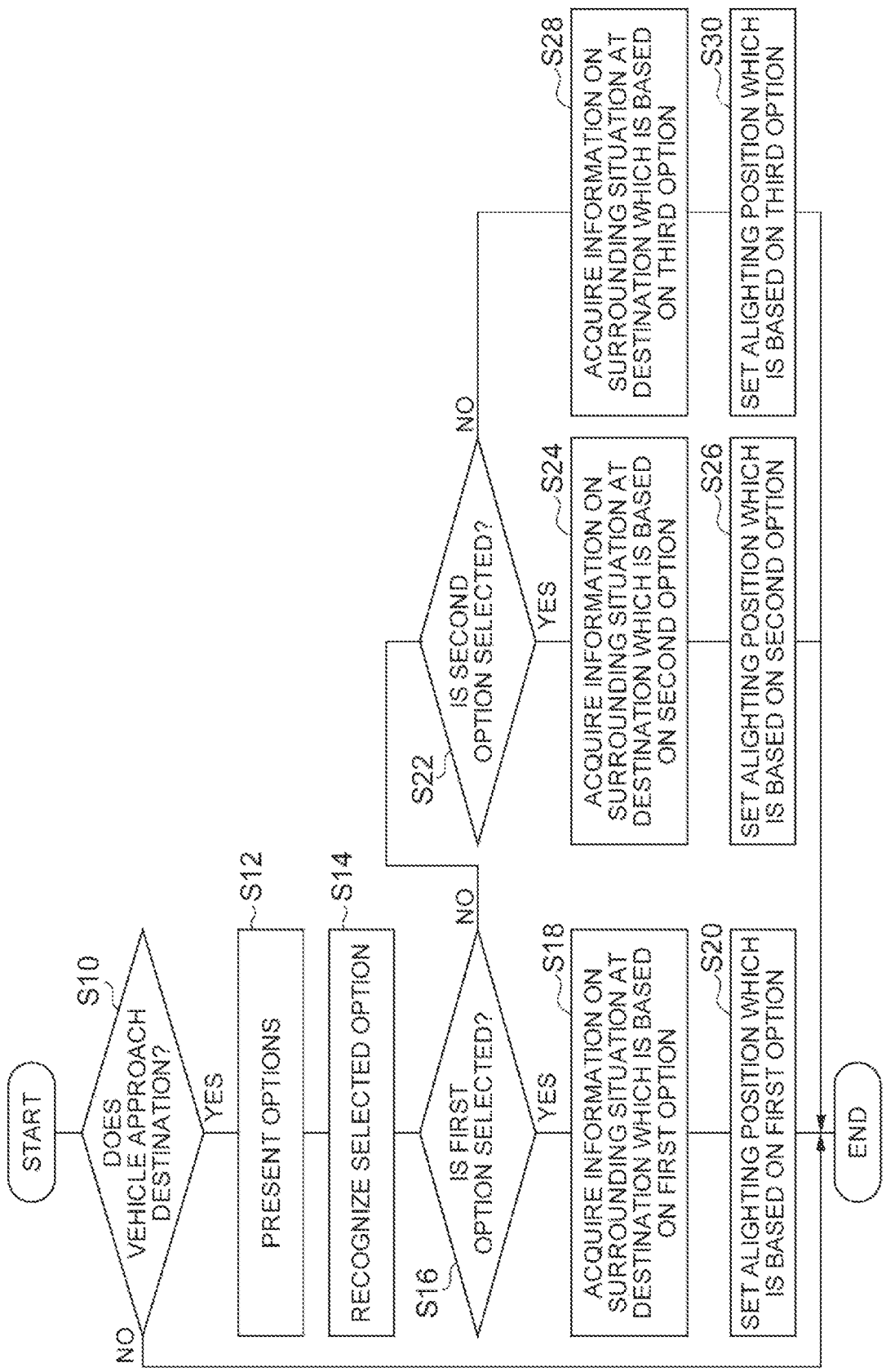
FIG. 2 is a flowchart illustrating alighting position setting processing.

Hereinafter, alighting position setting processing performed by the alighting position setting device 1 will be described. FIG. 2 is a flowchart illustrating the alighting position setting processing. The flowchart in FIG. 2 is executed during the autonomous driving of the vehicle toward the destination set in advance.

As illustrated in FIG. 2, in STEP S10, the alighting position setting device 1 determines whether or not the vehicle in the autonomous driving toward the destination set in advance approaches the destination. Specifically, if the result of determination that the vehicle approaches the destination is input by the autonomous driving ECU 3, the alighting position setting device 1 determines that the vehicle approaches the destination. On the other hand, if the result of determination that the vehicle approaches the destination is not input by the autonomous driving ECU 3, the alighting position setting device 1 determines that the vehicle does not approach the destination. If it is determined that the vehicle approaches the destination (YES in STEP S10), the alighting position setting device 1 makes the process proceed to STEP S12. On the other hand, if it is determined that the vehicle does not approach the destination (NC) in STEP S10), the alighting position setting device 1 ends the current processing and repeats the processing again from STEP S10.

In STEP S12, the alighting position setting device 1 presents the occupant of the vehicle with multiple Options set in advance relating to the request for the alighting position for the destination using the option presentation unit 11. The option presentation unit 11 presents the multiple options, for example, by the image output on the display and the voice output from the speaker of the HMI 4.

FIG. 3 is a diagram illustrating an example of the multiple options output as images to the display. As illustrated in FIG. 3, in the present embodiment, the option presentation unit 11 presents the first option of "alighting position: automatic setting by the system (time priority)", the second option of "alighting position: front of the main gate" and the third option of "alighting position: system's discretion". When the multiple options relating to the request for the alighting position are presented by the option presentation unit 11, the option that matches the occupant's desire is selected from these options by the occupant and the selected option is input by operating the button and the touch panel of the 4. Thereafter, the alighting position setting device 1 makes the process proceed to STEP S14.

Returning to FIG. 2, in STEP S14, the alighting position setting device 1 recognizes the option selected by the occupant from the first option, the second option, and the third option presented by the option presentation unit 11 using the option recognition unit 12. Thereafter, the alighting position setting device 1 makes the process proceed to STEP S16.

In STEP S16, the alighting position setting device 1 determines whether or not the recognized option is the first option using the option recognition unit 12. If it is determined that the recognized option is the first option (YES in STEP S16), the alighting position setting device 1 makes the process proceed to STEP S18. On the other hand, if it is determined that the recognized option is not the first option (NO in STEP S16), the alighting position setting device 1 makes the process proceed to STEP S22.

In STEP S18, the alighting position setting device 1 acquires the information on the surroundings situation at the destination input from the communication unit 2. The alighting position setting device 1 may acquire only the information (that is, information based on the first option) necessary for setting the alighting position corresponding to the first option. Thereafter, the alighting position setting device 1 makes the process proceed to STEP S20.

In STEP S20, the alighting position setting device 1 sets any point at the destination as the alighting position (that is, the alighting position based on the first option) based on the request for the alighting position corresponding to the first option of "alighting position: automatic setting by the system (time priority)" selected by the occupant using the alighting position setting unit 13. When the alighting position at the destination is set, the alighting position setting device 1 ends the current processing. Thereafter, the autonomous driving ECU 3 performs the autonomous driving toward the alighting position set by the alighting position setting device 1.

In STEP S22, the alighting position setting device 1 determines whether or not the recognized option is the second option using the option recognition unit 12, if it is determined that the recognized option is the second option (YES in STEP S22), the alighting position setting device 1 makes the process proceed to STEP S24. On the other hand, if it is determined that the recognized option is not the second option (NO in STEP S22), the alighting position setting device 1 determines that the recognized option is the third option, and makes the process proceed to STEP S28.

In STEP S24, the alighting position setting device 1 acquires the information on the surroundings situation at the destination input from the communication unit 2. The alighting position setting device 1 may acquire only the information (that is, information based on the second option) necessary for setting the alighting position corresponding to the second option. Thereafter, the alighting position setting device 1 makes the process proceed to STEP S26.

In STEP S26, the alighting position setting device 1 sets the front of the main gate of the facility or the like which is the destination as the alighting position (that is, the alighting position based on the second option) based on the request for the alighting position corresponding to the second option of "alighting position: front of the main gate" selected by the occupant using the alighting position setting unit 13. When the alighting position at the destination is set, the alighting position setting device 1 ends the current processing. Thereafter, the autonomous driving ECU 3 performs the autonomous driving toward the alighting position set by the alighting position setting device 1.

In STEP S28, the alighting position setting device 1 obtains information on the surroundings situation at the destination input from the communication unit 2. The alighting position setting device 1 may acquire only the information (that is, information based on the third option) necessary for setting the alighting position corresponding to the third option. Thereafter, the alighting position setting device 1 makes the process proceed to STEP S30.

In STEP S30, the alighting position setting device 1 derives a specific point according to the predetermined proposed condition of the alighting position based on the request for the alighting position corresponding to the third option of "alighting position: system's discretion" selected by the occupant, and sets the derived point as the alighting position (that is, the alighting position based on the third option) using the alighting position setting unit 13. When the alighting position at the destination is set, the alighting position setting device 1 ends the current processing. Thereafter, the autonomous driving ECU 3 performs the autonomous driving toward the alighting position set by the alighting position setting device 1.

As described above, according to the alighting position setting device 1, when the vehicle in the autonomous driving approaches the destination, the option that matches the occupant's desire is selected by the occupant from the multiple options relating to the request for the alighting position. The alighting position is set based on the request for the alighting position corresponding to the selected option. Therefore, the alighting position setting device 1 can set the alighting position reflecting occupant's desire.

In the alighting position setting device 1, the option presentation unit 11 presents the first option and the third option in which the alighting position setting unit 13 automatically sets the alighting position, and the second option in which the occupant manually sets the alighting position. In this way, if the first option or the third option is selected by the occupant, the alighting position is automatically set. Therefore, it is possible to improve the convenience for the occupant. On the other hand, if the second option is selected by the occupant, the occupant sets the alighting position by him/herself. Therefore, the occupant's desire can be more appropriately reflected on the alighting position. Therefore, in the alighting position setting device 1, it is possible to appropriately set the alighting position according to the occupant's desire.

The embodiment described above can be implemented in various forms in which various changes and improvements are made based on knowledge of those skilled in the art.

Figure 4:
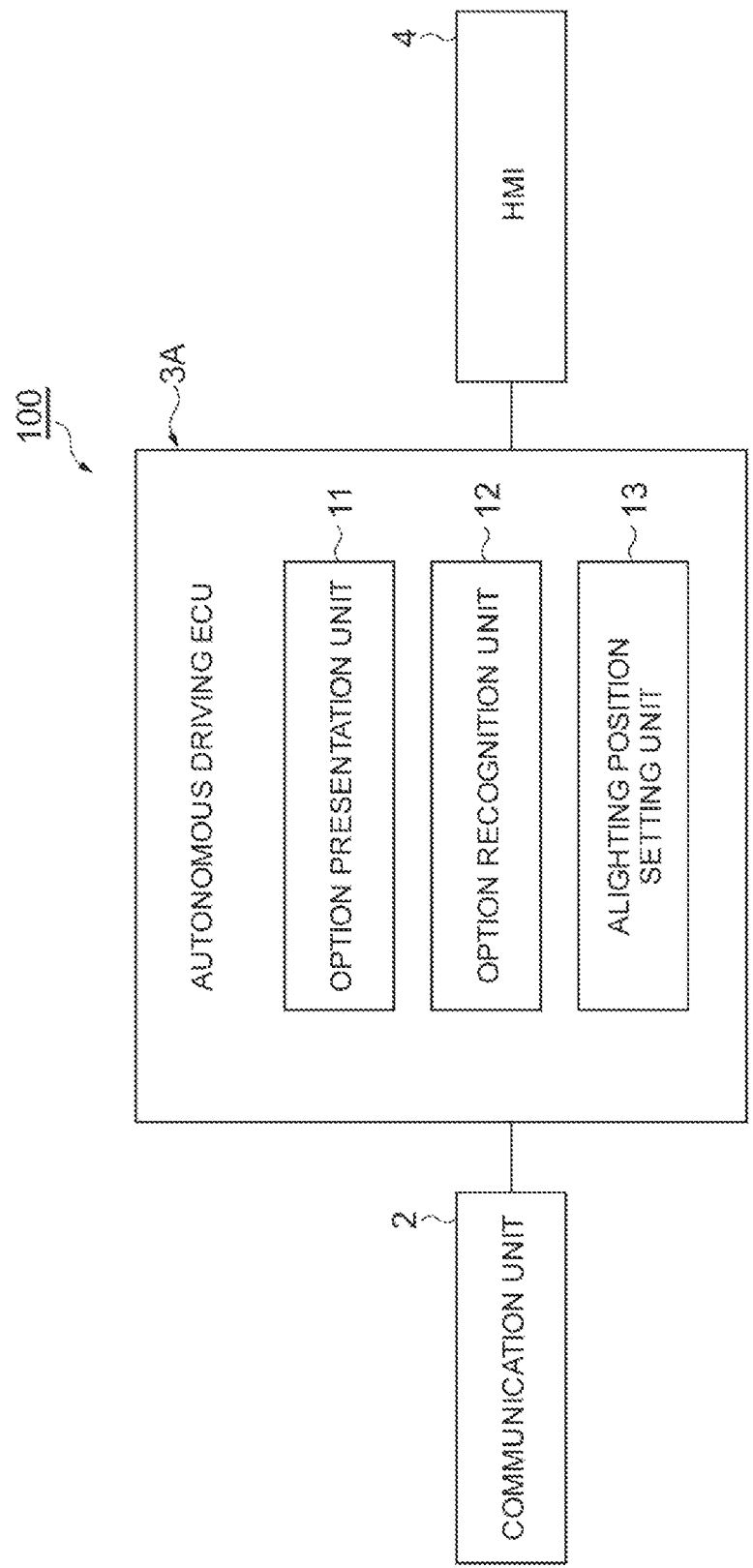
FIG. 4 is a block diagram illustrating an autonomous driving system.

For example, the alighting position setting device 1 described above may be a part of an autonomous driving system 100. FIG. 4 is a block diagram illustrating the autonomous driving system 100. In FIG. 4, the same reference numerals will be given to the same or corresponding elements in another drawing, and the description thereof will not be repeated. The autonomous driving system 100 illustrated in FIG. 4 is a system for performing the autonomous driving of the vehicle and setting the alighting position in the autonomous driving.

The autonomous driving system 100 may include an autonomous driving ECU 3A that includes both the function of the autonomous driving ECU 3 and the function of the alighting position setting ECU 10 described above. In this case, the communication unit 2 and the HMI 4 described above may be connected to the autonomous driving ECU 3A, and the autonomous driving ECU 3A may include the option presentation unit 11, the option recognition unit 12, the alighting position setting unit 13, and the autonomous driving control unit 14.

The autonomous driving ECU 3A performs overall control of the system and performs the autonomous driving of the vehicle. The autonomous driving ECU 3A is an electronic control unit that includes a CPU, a ROM, a RAM, a CAN communication circuit, and the like.

The autonomous driving ECU 3A realizes each function by loading a program stored in the ROM into the RAM and executing the program loaded in the RAM by the CPU. The autonomous driving ECU 3A may be configured with a plurality of ECUs. A part of the functions of the autonomous driving ECU 3A may be performed by a server capable of communicating with the vehicle.

When the vehicle in the autonomous driving toward the destination set in advance approaches the destination, the autonomous driving ECU 3A presents the occupant of the vehicle with multiple choices set in advance relating to the request for the alighting position for the destination, recognizes the option selected by the occupant from the multiple options, and sets the alighting position based on the request for the alighting position corresponding to the option selected by occupant. The autonomous driving ECU 3A may present multiple options including at least the automatic setting option in which the alighting position is automatically set, and the manual setting option in which the occupant manually sets the alighting position.

In addition, the autonomous driving control unit 14 may have each function of the autonomous driving ECU 3 described above. The autonomous driving control unit 14 may perform the autonomous driving toward the destination according to the travel plan. The autonomous driving control unit 14 may perform the autonomous driving by transmitting a control signal to each actuator of the vehicle. The autonomous driving control unit 14 may be able to generate the travel plan and perform the autonomous driving using a well-known method. If the alighting position is set by the alighting position setting unit 13 during the autonomous driving of the vehicle toward the destination according to the travel plan, the autonomous driving control unit 14 may perform the autonomous driving of the vehicle toward the alighting position.

The option presentation unit 11 may present multiple options set in advance relating to the request for the alighting position for the destination, and does not necessarily need to present the options as described above. The option presentation unit 11 may present only any one of the automatic setting option or the manual setting option. The specific details of the first option, the second option, and the third option are not limited to those described above. In addition, the option presentation unit 11 may not present the third option described above, and may also present options other than the first option, the second option, and the third option.

The condition set by the user in the third option is limited to the condition such as the point that can be reached with the minimum amount of fuel consumption within a range of the predetermined distance from the destination. For example, the condition set by the user in the third option may be a condition such as a point that can be reached with a minimum of traffic amount (or less traffic amount than a predetermined traffic amount) within a range of the predetermined distance from the destination.

In addition, if the first option or the third option is selected by the occupant, the alighting position setting device 1 may set the alighting position based on the map information stored in advance in the map database of the vehicle without acquiring the information on the surroundings situation at the destination input from the communication unit 2. That is, STEP S18 and STEP S28 in the flowchart in FIG. 2 may be omitted.

In addition, the second option is an option relating to the request for the alighting position such that the occupant manually sets the alighting position, but may be an option in which a specific alighting position is not specified. In this case, a message saying "alighting position: manual setting" is output as an image on the display of the HMI 4 as a second option. If the second option is selected, the alighting position setting device 1 causes the occupant to select a specific alighting position in STEP S26.

For example, in STEP S26, the alighting position setting device 1 may present new multiple options ("front of the main gate", "front of the back gate", "entrance of the parking", and the like) for causing the occupant to select a specific alighting position using the alighting position setting unit 13, and may set the alighting position based on the selected option.

Alternatively, in STEP S26, the alighting position setting device 1 may generate a two-dimensional or three-dimensional model of surroundings of the destination based on the image or moving pictures of the surroundings of the destination among the information items on the surroundings situation at the destination input from the communication unit 2 using the alighting position setting unit 13, and the generated model may be output as an image to the HMI 4. Then, when the position on the model output as an image on the display is designated by the occupant (for example, if the display is a touch panel, when a position on the model output as an image on the touch panel is touched by the occupant), the alighting position setting device 1 may set a point on the map corresponding to the designated position as the alighting position at the destination using the alighting position setting unit 13.

With regard to the processing for generating the models of the surroundings of the destination based on the information of the images and moving pictures of surroundings of the destination, the processing may be realized by, for example, using a machine learning algorithm. For example, the processing disclosed in Kenneth Vanhoey, Carlos Eduardo Porto de Oliveira, Hayko Riemenschneider, Andras Bodis- Szomoru, Santiago Manen, Danda Pani Paudel, Michael Gygli, Nikolay Kobyshev, Till Kroeger, Dengxin Dal, Luc Van Gool, "VarCity-theVideo: the Struggles and Triumphs of Leveraging Fundamental Research Results in a Graphics Video Production", ACM SIGGRAPH, 2017 may be used.

In addition, before presenting the occupant of the vehicle with the multiple options set in advance relating to the request for the alighting position for the destination, the option presentation unit 11 may acquire information on the surroundings situation at the destination via the communication unit 2, and may determine the multiple options to be presented from the multiple options set in advance, according to the acquired surroundings situation. In this way, the alighting position setting device 1 can present the options according to the surrounding situation at the destination (for example, traffic information, and the like).

What is claimed is:

1. An alighting position setting device comprising:
    a processor configured to:
        perform autonomous driving of an autonomous vehicle to a destination;
        when the autonomous vehicle reaches a point of a predetermined time before arrival at or a predetermined distance away from the destination on a route toward the destination:
            present an occupant of the autonomous vehicle with multiple options relating to a request for setting an alighting position, wherein the alighting position is a specific point within, or within a vicinity of, the destination and wherein the multiple options include a fuel-economy option and a manual option;
            receive a user selection of an option from among the multiple options;
            in a case that the user selection corresponds to the fuel-economy option, automatically set a system setting that causes the alighting position to be automatically set to a point that can be reached with a minimum amount of fuel consumption; and
            in a case that the user selection corresponds to the manual option, obtain a user input, and set the alighting position based on the user input.

\* \* \* \* \*